United States Patent [19]

Selkey et al.

[11] 4,360,769

[45] Nov. 23, 1982

[54] OPTICAL COUNTING MOTOR SHAFT POSITIONER

[75] Inventors: Fred C. Selkey, Hawthorn; Louis S. Smulkstys, Arlington Heights, both of Ill.

[73] Assignee: Honeywell Inc., Minneapolis, Minn.

[21] Appl. No.: 73,408

[22] Filed: Sep. 7, 1979

[51] Int. Cl.³ .............................................. G05B 1/03
[52] U.S. Cl. .................................. 318/601; 318/603; 340/347 M; 340/347 P
[58] Field of Search ............... 318/601, 603, 675, 468, 318/599; 340/347 M, 347 P

[56] References Cited

U.S. PATENT DOCUMENTS

| | | | |
|---|---|---|---|
| 3,092,402 | 6/1963 | Reed | 235/494 X |
| 3,629,710 | 12/1971 | Durland | 340/347 DA X |
| 3,646,545 | 2/1972 | Naydan et al. | 340/347 DA X |
| 3,673,393 | 6/1972 | Schober | 318/603 X |
| 3,843,915 | 10/1974 | Helmbold | 318/602 |
| 4,181,962 | 1/1980 | West et al. | 235/92 MP X |
| 4,234,833 | 11/1980 | Barrett | 318/468 X |

OTHER PUBLICATIONS

Schmid, Electronic Analog/Digital Conversions, Van Nostrand Reinhold Co., 1970, pp. 204–209.

*Primary Examiner*—Thomas J. Sloyan
*Attorney, Agent, or Firm*—Trevor B. Joike

[57] ABSTRACT

A system for positioning the output shaft of a motor is disclosed having a set of terminals for receiving a predetermined count representing a desired position for the output shaft, a counter having first and second inputs, the first input being connected to the set of terminals, a count generator associated with the output shaft and connected to the second input of the counter for supplying to the counter counts dependent upon the rotation of the output shaft, and a switch connected to the motor and to the counter for energizing the motor when the counter receives a predetermined count representing the new desired position and for de-energizing the motor when the count generator supplies a number of counts equal to the predetermined counts.

18 Claims, 2 Drawing Figures

OPTICAL COUNTING MOTOR SHAFT POSITIONER

BACKGROUND OF THE INVENTION

This invention relates to the positioning of the output shaft of a motor and, more paticularly, the positioning of the output shaft wherein the motor is under control of a counter which responds to both a predetermined count and to pulses generated by the output shaft of the motor as it is rotated.

Although the present application can be used for controlling many types of devices, it is particularly suitable for adjusting the control point in condition controlling systems from a remote point. In building automation systems, remote points are connected over a transmission channel to a central processing unit. The remote points may be temperature sensing thermostats, fans, chillers, dampers, and other devices relating to the control of the environment within a building. The central processing unit, either under control of an operator or under program control, uses the sensor inputs to control the temperature and humidity of the various zones throughout the building. When the central processing unit wishes to change the temperature at a remote zone, for example, for night setback or morning pickup, it transmits a signal representing the desired new condition which then adjusts the control point of the condition controlling system at the remote location. The condition controlling system then compares the new control point with the present condition as measured by the condition sensing sensor for taking the proper action to bring the actual condition to the desired condition.

Present control point adjustment mechanisms are plagued by a multitude of problems. The bi-directional motors which are used in present systems are troubled with high hysteresis; that is, if the motor is to be driven to a specific control point, there will be a discrepancy between the desired point and the actual point depending upon the direction in which the motor is driven. Also, the number of points at which the motor can be stopped in its full circle of rotation is not as great as it could be and, therefore, the present systems suffer from low resolution. Moreover, present systems suffer from no memory in the case of power failure; that is, if power fails the control point adjustment device will wander away from the point of the last setting.

SUMMARY OF THE INVENTION

The present invention solves many of these problems by providing a system for positioning the output shaft of a motor, the system having terminals for receiving a predetermined count representing a desired position for the output shaft, a counter having first and second inputs, the first input being connected to the terminals, a count generator associated with the output shaft and connected to the second input of the counter for supplying to the second input of the counter counts dependent upon the rotation of the output shaft, and a switch operated by the counter for energizing the motor when the counter receives a new predetermined count representing a desired position and for de-energizing the motor when the counts supplied by the count generator to the second input matches the predetermined count.

The system may be optical and it is preferable if the motor is a uni-directional motor.

BRIEF DESCRIPTION OF THE DRAWINGS

These and other features and advantages will become more apparent from a detailed consideration of the invention when taken in conjunction with the drawing in which.

DETAILED DESCRIPTION

Figure 1:
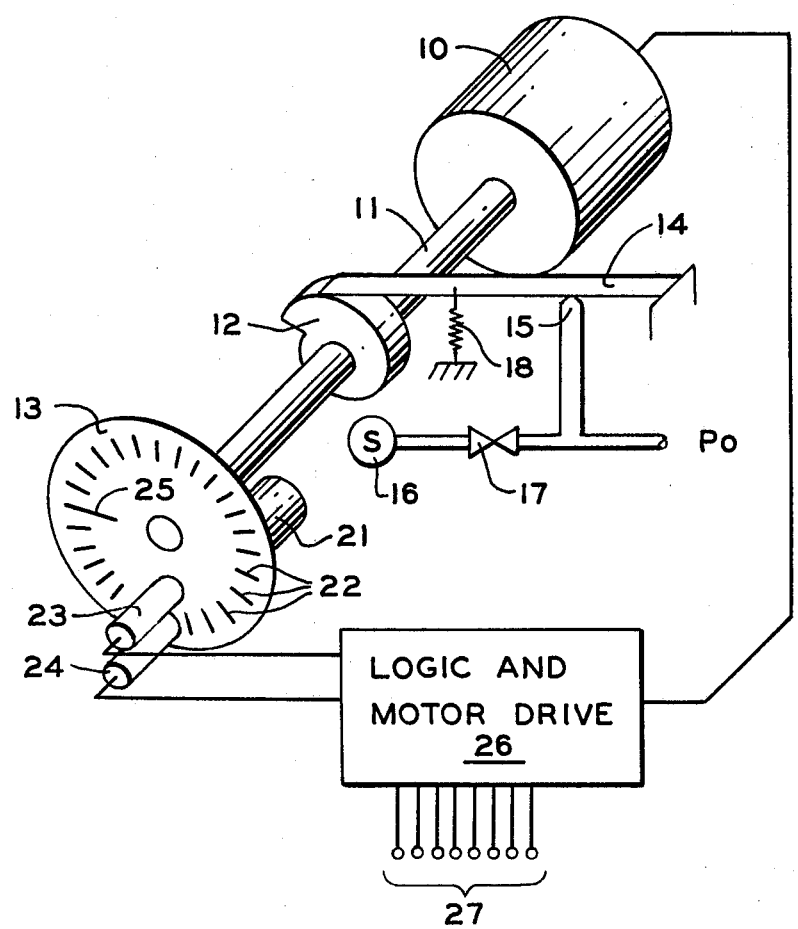
FIG. 1 is a diagram showing the encoded wheel which acts as the count generator being driven by the motor and supplying counts to the logic and motor control circuit;
and, FIG. 2 shows the logic and motor control circuit shown in block form in FIG. 1.

In FIG. 1, motor 10 drives output shaft 11 to which is affixed both cam 12 and optically encoded disc 13. Cam 12 operates flapper 14 which is positioned with respect to nozzle 15 for controlling the output pressure Po from supply 16 through restriction 17. Specifically, as flapper 14 is driven further away from nozzle 15, output pressure Po is reduced and as cam 12 allows spring 18 to draw flapper 14 nearer to nozzle 15, output pressure Po increases.

Associated with optically encoded disc 13 is light source 21 for shining light through a plurality of windows 22 positioned along the edge of disc 13 as shown in FIG. 1 for energizing photoresponsive devices 23 and 24. One of the windows 25 is elongated which allows light to pass from source 21 to photocell 23 for providing a reset pulse to logic and motor drive control circuit 26. The other windows 22 together with window 25 supply a plurality of pulses from photocell 24. In this manner, photocell 23 is energized once per revolution of optically encoded disc 13 and photocell 24 is energized an many times as there are windows 22 that pass between photocell 24 and source 21 during a revolution of optically encoded disc 13. Terminals 27 are connected to a first input of circuit 26 and photocells 23 and 24 form a second input for this circuit. Terminals 27 may be connected to a plurality of switches which are operated to supply circuit 26 with a count establishing a predetermined position for output shaft 11 with respect to elongated window 25 or may alternatively receive a count from a central processing unit. The operation of the switches or the input from the central processing unit for positioning shaft 11 corresponds to a desired output pressure Po which can then be used as a control point adjustment in a condition controlling system.

Figure 2:
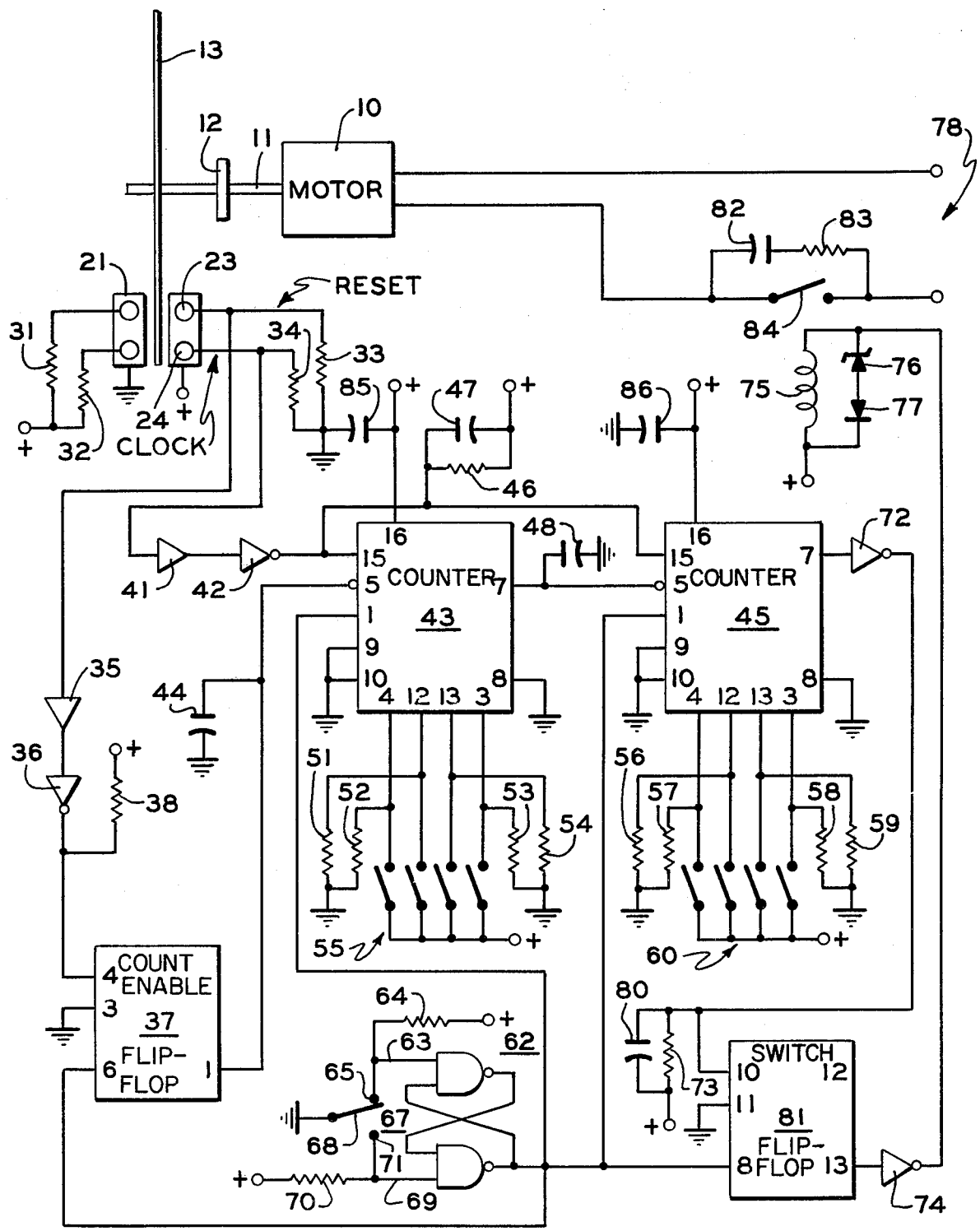

Logic and motor drive circuit 26 is shown in more detail in FIG. 2. In this figure, source 21 is comprised of a pair of light emitting diodes which are each connected through respective resistors 31 and 32 to a positive source. The other sides of these LEDs are connected to ground. One side of phototransistors 23 and 24 is connected to a positive source and the other side is connected to ground through respective resistors 33 and 34. The junction of photoresponsive device 23 and resistor 33 is connected through amplifier 35 and inverter 36 to pin 4 of flip-flop 37. The output of inverter 36 is also connected to a positive source through resistor 38. The junction of photoresponsive device 24 and resistor 34 is connected through amplifier 41 and inverter 42 to pin 15 of counter 43. The inverted input terminal, pin 5 of counter 43, is connected to ground through capacitor 44 and is also connected to output pin 1 of flip-flop 37 which has its pin 3 connected to ground. Pins 15 of counter 43 and counter 45 are connected together and to a positive source through the parallel combination of resistor 46 and capacitor 47. Output pin 7 of counter 43 is connected to inverted input pin 5 of counter 45 and is also connected to ground through capacitor 48. Pins 8, 9 and 10 of both counters 43 and 45 are tied to ground. Pins 4, 12, 13 and 3 of counter 43 are tied respectively through resistors 51, 52, 53, and 54 to ground and also to a positive source through switch bank 55. Similarly, pins 4, 12, 13, and 3 of counter 45 are connected to ground through respective resistors 56, 57, 58 and 59 and are also connected to a positive source through switch bank 60. Switch banks 55 and 60 are used to provide a count input to counters 43 and 45. As an alternative to these switches, these input pins of counters 43 and 45 can be connected to the outputs from a central processing unit which can generate an input count to counters 43 and 45 as well as a reset signal in place of switch 67.

Latch 62 has first input 63 connected to a positive source through resistor 64 and also connected to terminal 65 of switch 67 which has a movable contact 68 connected to ground. Input 69 of this latch is tied to a positive source through resistor 70 and is also connected to terminal 71 of switch 67. Latch 62 is used to provide a reset to counters 43, 45, flip-flop 37 and flip-flop 81. Output pin 7 of counter 45 is connected through inverter 72 to pin 10 of flip-flop 81 and is also connected to a positive source through the parallel combination of capacitor 80 and resistor 73. Pin 11 is tied to ground, pin 8 is tied to the output of latch 62, and pin 13 is connected through inverter 74 to one side of relay coil 75 across which is connected zener diode 76 and diode 77 and the other side of which is connected to a positive source. Motor 10 is connected to a pair of terminals 78 which receive power. These terminals are connected to motor 10 when switch 84 is closed by relay coil 75. Connected in parallel to switch 84 is the series combination of capacitor 82 and resistor 83. Connected to pin 16 of counter 43 is a positive source which is also connected to ground through capacitor 85 and connected to pin 16 of counter 45 is a positive source which is also connected to ground through capacitor 86.

In operation, when the output shaft 11 of motor 10 is to be rotated to a new position, switches 55 and 60 are operated to provide input counts to counters 43 and 45 representing the new desired predetermined position for output shaft 11 and, as a result, cam 12. Switch 67 is then operated by moving contact 68 against contact 71 which supplies a reset pulse to pin 6 of flip-flop 37, a set pulse to pin 8 of flip-flop 81 and parallel enable signals to pins 1 of counters 43 and 45 for loading the information contained in switches 55 and 60 into counters 43 and 45. When flip-flop 81 is set, relay 75 closes switch 84 to energize motor 10. Motor 10 rotates disc 13 until photosensor 23 responds to window 25 for supplying a reset pulse to set flip-flop 37 which then provides a count enable signal to pin 5 of counter 43. Counter 43 and counter 45 then begin to count the clock pulses at their pins 15 as supplied by photosensor 24. When down counters 43 and 45 down count to 0 by the number of counts established by switches 55 and 60 plus one additional count, pin 7 of counter 45 resets flip-flop 81 for de-energizing relay coil 75 to thereby open switch 84 and de-energize motor 10. Thus, when switches 55 and 60 are initially operated, they must be arranged to take into account that one extra count is needed before pin 7 of counter 45 changes state. Actuation of movable contact 68 against contact 71 need only be temporary and can be returned to contact 65 immediately.

Counters 43 and 45 may be supplied under standard part no. MC14516B and flip-flops 37 and 81 may be supplied under standard part no. MC14013.

The embodiments of the invention in which an exclusive property or right is claimed are defined as follows:

1. A system for positioning the output shaft of a motor comprising:

terminal means for receiving a predetermined count representing a desired position for said output shaft;

counting means having a first input connected to said terminal means for receiving said predetermined count, a second input for receiving a count enable signal, and third input means;

count generating means including an optically encoded disc to be driven by said output shaft, said optically encoded disc having a reset window and a plurality of count windows, said count generating means further comprising a light source on one side of said disc and first and second photosensors on the other side of said disc, said first photosensor being operated by said reset window once per revolution of said shaft for supplying said count enable pulse to said second input of said counting means to allow said counting means to count and said second photosensor being operated by said count windows for supplying counts to said third input means of said counting means dependent upon the rotation of said output shaft; and, switch means connected to said motor and to said counting means for energizing said motor when said counting means receives a predetermined count representing a new desired position and for de-energizing said motor when said counts supplied by said second photosensor to said third input means matches said predetermined count.

2. The system of claim 1 wherein said count generating means further comprises a count enable switch responsive to said first photosensor for providing said count enable signal to said second input of said counting means.

3. The system of claim 2 wherein said counting means comprises parallel enable means connected to a parallel enable terminal of said third input means for loading in said predetermined count into said counter.

4. The system of claim 3 wherein said switch means comprises a first switch having a first input connected to said counting means and a second input connected to said parallel enable means and an output, and a second switch connected to said output of said first switch for energizing said motor when said predetermined count is loaded into said counting means by said parallel enable means and for de-energizing said motor when said count supplied by said second photosensor matches said predetermined count.

5. A system for positioning the output shaft of a motor comprising:

terminal means for receiving a predetermined count representing a desired position for said output shaft;

down counting means having first and second inputs, said first input being connected to said terminal means so that said predetermined count can be loaded into said down counting;

parallel enable means for loading in said predetermined count into said down counting means and for initiating energization of said motor means;

count generating means associated with said output shaft and connected to said second input of said down counting means for supplying said down counting means with counts dependent upon the rotation of said output shaft and for supplying a count enable pulse to said down counting means for allowing said down counting means to begin down counting said counts; and, switch means connected to said motor, to said down counting means and to said parallel enable means for energizing said motor when said motor is to be driven to a new position and for de-energizing said motor when said counts supplied by said count generating means to said second input matches said predetermined count.

6. The system of claim 5 wherein said count generating means comprises reset means for generating said control enable signal once per revolution of said output shaft and count means for generating said counts dependent upon the rotation of said output shaft.

7. The system of claim 5 wherein said count generating means comprises an optically encoded disc having a reset window and a plurality of count windows therearound, said count generating means further comprises a light source on one side of said disc and first and second photosensors on the other side of said disc, said first photosensor being controlled by said reset window once per revolution of said shaft for supplying said count enable pulse and said second photosensor being controlled by said count windows for supplying said counts.

8. The system of claim 5 wherein said motor comprises a uni-directional motor which is driven in the same direction whenever it is energized.

9. The system of claim 8 wherein said count generating means comprises reset means for generating said control enable signal once per revolution of said output shaft and count means for generating said counts dependent upon the rotation of said output shaft.

10. The system of claim 8 wherein said count generating means comprises an optically encoded disc having a reset window and a plurality of count windows therearound, said count generating means further comprises a light source on one side of said disc and first and second photosensors on the other side of said disc, said first photosensor being controlled by said reset window once per revolution of said shaft for supplying said count enable pulse and said second photosensor being controlled by said count windows for supplying said counts.

11. The system of claim 6 wherein said switch means comprises a first switch operated by said down counting means and a second switch responsive to said first switch for energizing and de-energizing said motor.

12. The system of claim 11 wherein said reset means comprises a reset pulse means for generating a reset pulse once per revolution of said output shaft and a count enable switch having a first input connected to said reset pulse means, an output connected to a count enable terminal of said down counting means, and a second input, and said first switch has a first input connected to an output of said down counting means, an output connected to said second switch, and a second input, said second inputs of said count enable switch and of said first switch being connected to said parallel enable means.

13. The system of claim 7 wherein said switch means comprises a first switch operated by said down counting means and a second switch responsive to said first switch for energizing and de-energizing said motor.

14. The system of claim 13 wherein said count generating means comprises a count enable switch having a first input connected to said first photosensor, an output connected to a count enable terminal of said down counting means, and a second input, and said first switch has a first input connected to an output of said down counting means, an output connected to said second switch, and a second input, said second inputs of said count enable switch and of said first switch being connected to said parallel enable means.

15. The system of claim 9 wherein said switch means comprises a first switch operated by said down counting means and a second switch responsive to said first switch for energizing and de-energizing said motor.

16. The system of claim 15 wherein said reset means comprises a reset pulse means for generating a reset pulse once per revolution of said output shaft and a count enable switch having a first input connected to said reset pulse means, an output connected to a count enable terminal of said down counting means, and a second input, and said first switch has a first input connected to an output of said down counting means, an output connected to said second switch, and a second input, said second inputs of said count enable switch and of said first switch being connected to said parallel enable means.

17. The system of claim 10 wherein said switch means comprises a first switch operated by said down counting means and a second switch responsive to said first switch for energizing and de-energizing said motor.

18. The system of claim 17 wherein said count generating means comprises a count enable switch having a first input connected to said first photosensor, an output connected to a count enable terminal of said down counting means, and a second input, and said first switch has a first input connected to an output of said down counting means, an output connected to said second switch, and a second input, said second inputs of said count enable switch and of said first switch being connected to said parallel enable means.

* * * * *